(12) United States Patent
Diemer et al.

(10) Patent No.: US 7,794,594 B2
(45) Date of Patent: Sep. 14, 2010

(54) FILTER MODULE

(75) Inventors: Wolfgang Diemer, Waldstetten (DE); Martin Zeiler, Waldstetten (DE); Georg Schnieder, Bad Kreuznach (DE); Gerhard Strohm, Dexheim (DE)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 10/312,079

(22) PCT Filed: Jun. 26, 2001

(86) PCT No.: PCT/EP01/07277

§ 371 (c)(1),
(2), (4) Date: Feb. 4, 2003

(87) PCT Pub. No.: WO02/00320

PCT Pub. Date: Jan. 3, 2002

(65) Prior Publication Data

US 2003/0159981 A1 Aug. 28, 2003

(30) Foreign Application Priority Data

Jun. 26, 2000 (DE) ................................ 100 29 960

(51) Int. Cl.
*B01D 25/26* (2006.01)
(52) U.S. Cl. ........................ 210/346; 210/347; 210/456; 210/486
(58) Field of Classification Search .................. 210/330, 210/331, 333.01, 346, 347, 343, 345, 486, 210/492, 456, 483
See application file for complete search history.

(56) References Cited

U.S. PATENT DOCUMENTS

| | | |
|---|---|---|
| 618,964 A | 2/1899 | Theurer |
| 1,015,326 A | 1/1912 | Kiefer |
| 1,138,251 A | 5/1915 | Schaefer |
| 1,197,403 A | 9/1916 | Seavey |
| 1,446,187 A | 2/1923 | Kessler |

(Continued)

FOREIGN PATENT DOCUMENTS

DE 944 065 C 6/1956

(Continued)

OTHER PUBLICATIONS

International Preliminary Examination Report completed Nov. 29, 2000 for International Application No. PCT/EP99/05011.

(Continued)

*Primary Examiner*—Matthew O Savage
(74) *Attorney, Agent, or Firm*—Leydig, Voit & Mayer, Ltd.

(57) ABSTRACT

The invention relates to a filter module (1) comprising filters layers (4a, b) made of a filter medium, especially comprising filter layers made of filter strata. Said filter layers alternate with layers made of draining spacer elements 910, 10a, b, 20), the first and last layer of the filter module (1) consisting respectively of a draining spacer element (10a, b, 20). The draining spacer elements respectively and mutually comprise flow elements (12a, b) and sealing elements (11a, b) for the filtrate chamber and the non-filtrate chamber (40, 41). Means are provided for the mutual connection thereof. The aim of the filter module (1) is to combine the advantages of known filter modules with improved sealing at the edges of the filter layers, and to make the filter module backwashable. The filter module (1) comprises draining spacer elements (10, 10a, b, 20) which are embodied in such a way that they enable the filter layers to be pressed in a sealing manner. At least some of the draining spacer elements (10, 10a, b, 20) comprise connecting means in the region of at least one filtrate chamber or non-filtrate chamber (40, 41), which co-operate with the connecting means of at least one other spacer element. The connecting means include lugs, stirrup straps (16a, b, 23a, b), and T and arrow-shaped catch elements. In this way, a stable and both backwashable filter module (1) is created.

31 Claims, 9 Drawing Sheets

U.S. PATENT DOCUMENTS

| | | | | |
|---|---|---|---|---|
| 2,079,365 | A | 5/1937 | Thomas | |
| 2,088,199 | A | 7/1937 | Gleason | |
| 2,631,732 | A | 3/1953 | Vocelka | |
| 3,083,834 | A | 4/1963 | Pall | |
| 3,241,678 | A | 3/1966 | Wrotnowski | |
| 3,294,241 | A | 12/1966 | Sicard et al. | |
| 3,333,702 | A | 8/1967 | Müller | |
| 3,347,384 | A | 10/1967 | Müller | |
| 3,443,697 | A * | 5/1969 | Seggebruch | 210/344 |
| 3,561,602 | A | 2/1971 | Moliter | |
| 3,624,778 | A | 11/1971 | Weber | |
| 3,647,084 | A | 3/1972 | Martin | |
| 3,666,107 | A | 5/1972 | Boggs et al. | |
| 3,702,659 | A | 11/1972 | Clark | |
| 4,016,080 | A | 4/1977 | Williams | |
| 4,347,208 | A | 8/1982 | Southall | |
| 4,664,812 | A | 5/1987 | Klein | |
| 4,704,207 | A * | 11/1987 | Chu | 210/347 |
| 4,793,922 | A | 12/1988 | Morton | |
| 4,793,928 | A | 12/1988 | Tsukamoto et al. | |
| 4,871,456 | A | 10/1989 | Naruo et al. | |
| 4,876,007 | A | 10/1989 | Naruo et al. | |
| 5,112,503 | A | 5/1992 | Raifman | |
| 5,449,458 | A | 9/1995 | Gneuss | |
| 5,538,634 | A | 7/1996 | Pfiffner et al. | |
| 5,549,824 | A | 8/1996 | Trumpf et al. | |
| 5,601,710 | A | 2/1997 | Yoon et al. | |
| 5,607,581 | A | 3/1997 | Gerner et al. | |
| 5,904,846 | A | 5/1999 | Clements et al. | |
| 5,965,019 | A | 10/1999 | Olsen et al. | |
| 6,669,844 | B2 | 12/2003 | Strohm et al. | |
| 6,827,851 | B1 * | 12/2004 | Strohm et al. | 210/228 |
| 6,875,352 | B1 | 4/2005 | Diemer et al. | |
| 2002/0046971 | A1 | 4/2002 | Strohm et al. | |
| 2002/0060184 | A1 | 5/2002 | Pulek et al. | |
| 2002/0134732 | A1 | 9/2002 | Wiseburgh et al. | |

FOREIGN PATENT DOCUMENTS

| | | | |
|---|---|---|---|
| DE | 1 636 118 B1 | | 8/1971 |
| DE | 3239687 | | 5/1984 |
| DE | 42 14 694 A1 | | 11/1993 |
| DE | 37 41 552 | | 10/1994 |
| DE | 19837257 | | 2/2000 |
| DE | 198 36 949 | | 7/2000 |
| DE | 198 36 949 A1 | | 7/2000 |
| EP | 0 028 531 A1 | | 5/1981 |
| EP | 0233999 | | 10/1986 |
| EP | 0 291 883 | | 11/1988 |
| EP | 0 327 394 A2 | | 8/1989 |
| JP | 4-171011 A | | 6/1992 |
| WO | WO 00/10684 | * | 3/2000 |
| WO | WO 00/35555 | | 6/2000 |

OTHER PUBLICATIONS

International Preliminary Examination Report completed Nov. 30, 2000 for International Application No. PCT/EP99/04997.

International Preliminary Examination Report completed Mar. 16, 2001 for International Application No. PCT/EP99/09634.

International Preliminary Examination Report completed Sep. 10, 2002 for International Application No. PCT/EP01/07277.

* cited by examiner

FILTER MODULE

DESCRIPTION

The present invention concerns a filter module having filter layers made of a filter medium, especially having filter layers made of filter strata. Said filter layers alternate with layers made of draining spacer elements, and the draining spacer elements have respectively and mutually flow elements on one side and sealing elements on the other for the filtrate chamber and non-filtrate chamber. Means for mutual connecting thereof are provided.

Such filter modules are known in a variety of constructive forms. A common trait of the majority of these filter modules is that the filter layers are manufactured from flat materials, e.g., filter cartons, papers, fleeces, or fabrics.

Filter strata consist as a rule of deep filter material that contains organic and/or inorganic fibrous, and/or granular matter. Used as a rule as a basic material for filter strata are cellulose or synthetic material fibers, in which Kieselgur, perlite, metal oxides, or other filtration-active substances can be stored. Kieselgur and perlite hereby serve to enlarge the inner surface and thus to enlarge the ability to collect impurities.

The range of use for the filter strata includes clarifying and treating fluids for the entire beverage industry, as well as the pharmaceutical industry, and the chemical industry. Filter strata have not only a straining effect, in which coarse particles are retained on the surface of the filter layer, but also especially a deep effect for fine particles that are retained in the hollow spaces within the deep filter material. Depending on the type of materials used, these filter strata can also have an absorption effect and the surface can be treated afterwards for specific purposes so that fibrous particles cannot be loosened when they are in a dry or damp state.

A filter module is known form U.S. Pat. No. 4,347,208, made of filter cells whose core consists of a draining spacer made of synthetic material on which a filter layer made of a filter medium in the form of flat disks on both sides lies. A filtrate opening is provided in the center of the filter cell. The outer edge of filter cells of this type must be extruded with a synthetic material for sealing purposes, which is expensive, because special forms must be used that have to be adapted to the geometry of the filter cell. Sealing the filter cell from the non-filtrate chamber is performed by pressing together both filter material layers, which are in contact with each other only in the edge region, and by forming a U-shaped plastic element that grips along the edge region.

In EP 0,233,999, such a filter module is also described in which so-called outer spacers are also arranged between the filter cells. They keep the filter cells at a distance in order to prevent the filter cells from being damaged, collapsing, or being saturated in the filter cells. Moreover, the radial flow between the filter cells should be improved. The inner and outer spacers are shaped variously, so that different tools are needed for manufacturing. Extruded filter cells are used in this filter module as well.

EP 0,291,883 describes a filter module made of filter cells stacked on top of one another. To make the described module, filter pockets having drainage material within them are manufactured, which are enclosed by a sealing element and a synthetic material mass in a leak-proof manner. The pockets are stacked on top of one another in such a way that the fluid can penetrate between the cells. Additional components for the spaced arrangement of the filter strata are necessary for this filter module as well. The flow through the filter module occurs in the plane of the filter strata, which then must still be flowed through perpendicular to the strata planes in order for filtration to take place. Unless special measures are taken, these filter cells cannot be back-washed.

Another filter module is known from DE 37 41 552 A1. This filter module, in which a number of filter cells is combined, is equipped with a central support tube, on which filter cells are pressed together axially between two adapter pieces attached to both ends of the support tube and are held sealed against one another. The interior of the support tube is connected to the inner chamber of each of the filter cells via flow channels arranged in the circumferential wall of the support tube and thus forms a common outlet channel for the filtrate for all filter cells.

Because many modules are not backwashable, the trend in recent times has been towards filter strata having no opening in their arrangement.

From 198 36 949.2-27 a filter module is known having collecting/distributing strata for the filtrate and the non-filtrate. Between said respective strata, at least one filter stratum made of deep filter material is arranged. Both filter strata and the collecting/distributing strata are produced form the same basic material, but have different separation efficiencies. The collecting/distributing strata are reciprocally sealed to the filtration/non-filtration chamber. The sealing elements can consist of molded parts that have means for mutual connection.

From DE 198 37 257 a filter module is known that has layers made of a filter medium. Draining spacer elements are arranged between said layers. The draining spacer elements are likewise reciprocally sealed to the filtrate/non-filtrate chamber. Furthermore the draining strata likewise have reciprocal flow elements that comprise a solid frame having a bore hole or grooves lying in the plane of the draining strata. The sealing elements and/or the flow elements have means for mutual connection, either the flow elements or the sealing elements still being able to be connected.

The draining spacer elements are implemented with sealing element and flow element in one unit, whereby cost-effective components can be produced that only need to be combined with the filter strata and assembled. Since the flow and seal elements have the same thickness as the draining spacer elements, the filter strata are not compressed in the edge region when the filter module is assembled, with the result that bypasses cannot be excluded in this area. The filter strata are open for flow-through in the side edge region.

The connecting means serve only to attach the entire module, without there thus being an improvement in the sealing.

The task of the present invention is a filter module that combines the advantages of this known filter module with an improved sealing in the edge region and that is backwashable and can be moved in any direction of flow.

The solution for this problem is a filter module that is characterized in that the draining spacer elements are implemented so as to press and seal off the filter layers, and so that at least some of the draining spacer elements have connecting means in the region of at least one filtrate or non-filtrate chamber, wherein the connecting means of these spacer elements cooperate with the connecting means of at least one other spacer element.

The filtrate or non-filtrate chambers are understood to be the spaces surrounding the filter module and the collecting channels(s) extending in the axial direction of the filter module for the filtrate or non-filtrate. Customarily, the filter module possesses a filtrate/non-filtrate chamber arranged in the middle. But multiple filtrate/non-filtrate chambers of a type extending through the filter module are also possible.

This filter module has a series of advantages.

Due to the flat position of the filter layers on the draining spacer elements, wherein the filter layers are attached in the edge region between the spacer elements, and due to the reciprocal connection of the draining spacer elements via connecting means, an overall stable filter module is created that cannot be distorted and that is also backwashable. The filter layers are prevented from being deformed during backwashing.

Because the draining spacer elements are arranged on the filter layers on both sides and the filter layers are thus supported on both sides, for purposes of filtration, filter materials can be used the have a low inherent stiffness.

The rigid connection, especially on the outer edge, helps to create a filter module with a stable design that can withstand all strains on it during storage, delivery, and use. Further, damages to the filter layers when they are inserted and taken out from the filter housing. If ring-shaped filter layers are used, the filtrate/non-filtrate channel is, as a rule, arranged in the middle, where the draining spacer elements likewise have connecting elements. Stability is thereby increased additionally.

These inventive measures decidedly improve the resistance to back-pressure in the filter module, an important factor when vacuum forces or pressure shocks occur due to hookup errors.

Since the draining spacer elements are connected to each other, the height of the filter module can be whatever is desired. Furthermore, the diameters of the filter layers and the draining spacer elements can be adapted to the diameters of conventional filter housings, so that effective filter area is not lost and usage in known filter housings presents no problems.

While the filter layers in the core region of the filter cells cannot be prevented from sticking together in conventional filter cells, this is not a problem here, because of the draining spacer elements on both sides of the filter layers. The filter layers are exploited to the fullest advantage, especially even during low differential pressure.

Moreover, filtration is possible in both directions, i.e., the module can work when the flow direction is switched. An absolute filtration of remnants is thus possible, i.e., after filtration there is no more non-filtrate in the housing. This is especially important for the filtration of expensive solutions. The filter housing does not need to be cleaned after filtrating toxic fluids, for example, so that contact with toxic materials is thereby prevented.

The highest and lowest filter layer of the filter module can be capped with non-draining spacer elements, for example. It is also possible to use conventional filter cells as upper and lower caps, said cells having connecting means on the extruded outer edge.

Preferably, the connecting means of adjacent spacer elements cooperate to connect together the outer/first edge regions of the adjacent draining spacer elements. It is also possible that the connecting means encompass respectively one or more adjacent spacer elements and first cooperate with the connecting means of one or more successive spacer elements.

The spacer element preferably includes a drainage element, at least one sealing element and/or a flow element. The number of sealing and/or flow elements corresponds to the number of filtrate and/or non-filtrate chambers to which the respective spacer element is adjacent.

Advantageously, two different draining spacer elements (first and second draining spacer elements) are provided that alternate in their arrangement in the filter module.

Preferably, the first spacer element has the sealing element on the inner circumference and the second spacer element has the sealing element on the outer circumference.

Preferably, the sealing elements and the flow elements of the first draining spacer elements are thicker than the sealing and flow elements of the second draining spacer elements. Between the first draining spacer element and the filter layer in the non-attached region, a more or less wide opening is thereby formed, depending on the thickness of the filter layer after the filter module is assembled.

Preferably, the first spacer element has a corresponding inner wedge-shaped connecting element and/or an outer wedge-shaped connecting element between the drainage element and the sealing element and/or the flow element.

The wedge-shaped connecting elements have at least one upper and at least one lower wedge area with an inclination between 10° and 60°. Tapering radially until the thickness of the drainage element is reached, the wedge-shaped connecting elements preferably have a thickness that corresponds to the sealing element and/or the flow element. A smooth transition is thereby made between the sealing element and/or flow element and the drainage element, which is advantageous for sealing purposes. During assembly, the filter stratum is continuously compressed with the second spacer elements toward the edge region of the spacer elements so that the filter stratum is not subjected to any uncontrolled deformations that could lead to bypasses.

The wedge-shaped connecting elements preferably have respectively two wedge areas, wherein the wedge in the x<1 range mm is at an angle $\alpha_2 < 20°$.

Advantageously, the drainage element formed in one piece with the sealing element and/or the flow element and/or the wedge-shaped connecting element, so that a one-piece plastic extruded part, for example, can be manufactured.

A further simplification is possible when the connecting means are likewise formed in one piece with the spacer element.

The connecting means can be implemented in various ways. Preferably, the connecting means of the spacer elements are form-locking. In another embodiment, the connecting means of the spacer elements are positive-fitting.

Since the spacer elements have flow and/or sealing elements in their edge regions, the connecting means are preferably arranged on, and especially formed onto, the flow and/or sealing elements when the embodiment is of one piece.

Advantageously, the connecting elements comprise clips in which catch lugs grip. The clips can be U-shaped or L-shaped, for example.

The clips point upward and downward. An alternating arrangement of upward and downward pointing clips is preferred.

To create the most rigid module unit possible, the clips are arranged in the circumferential direction of the spacer elements, preferably directly next to one another.

In another preferred embodiment, the clips can be arranged at intervals to one other in the circumferential direction of the spacer element, whereby the interval may be a max. 500 mm. The connecting elements are distributed uniformly over the circumference, the number depending on the circumference size. The connecting means, especially the clips, help protect against the impact on the clipped filter layers edge in the radial direction.

In another embodiment connecting means are arranged in a slot that runs around on a spacer element, with catch hooks on another spacer element that reach into the slot. The circular-running slot can be arranged in the sealing element of the spacer element or in the flow element. The slot is preferably delimited by catch rings.

Preferably, the catch lugs, hooks, rings, and/or clips have gliding bevels on their outer sides. Combining and locking the connecting means is thus made easier. When the filter module is assembled, the filter layers and the draining spacer elements are stacked onto one another and the entire package is then pressed together, whereby the clips, catch lugs, etc., catch in one another. The corresponding connecting means must run over the outer surfaces of the connecting partners, whereby the gliding bevels make this process easier.

To ensure a secure hold, the contact surfaces of the form-locking connecting means are preferably slanted, whereby, preferably, the corresponding overarching contact surface is slanted inwardly counter to the connecting means that is being gripped. A clip-type connection is thereby created.

Other embodiments of the connecting means can be sleeves and dowels with or without teeth, T-shaped or arrow-shaped locking elements gripping one another on both sides.

According to another embodiment, fastening means running around on the spacer elements, e.g., hook rings, can be provided onto which a web or grid is attached that wraps around the filter modules. The web or grid in this embodiment serves also as a connecting means that holds the spacer elements and thus the filter module together.

The connecting means can be provided exclusively on the outer circumference of the spacer elements. It is also possible that, besides being arranged on the outer circumference of the spacer elements, the connecting means are also arranged on the inner circumference, wherein the inner circumference means the edge region, which borders the collecting and thus filtrate and/or non-filtrate chambers arranged in the interior of the filter module.

The connecting means can be rated in such a way that they can withstand a tractive stress that corresponds to a clamping pressure between 1 N/mm$^2$ to 30 N/mm$^2$ in the pressing and sealing action on the filter layers.

Preferably, the sealing and/or flow elements are formed as bead-like swellings of the draining spacer elements.

Example embodiments of the present invention are further explained by means of the following drawings.

Figure 3A:
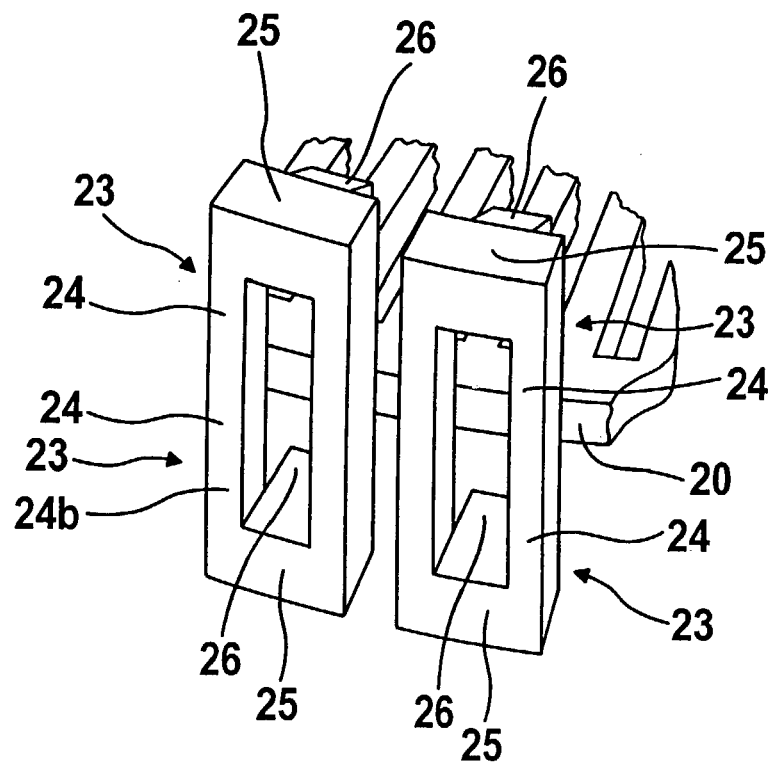
FIG. 3a shows an enlarged view of the clips.
Figure 3B:
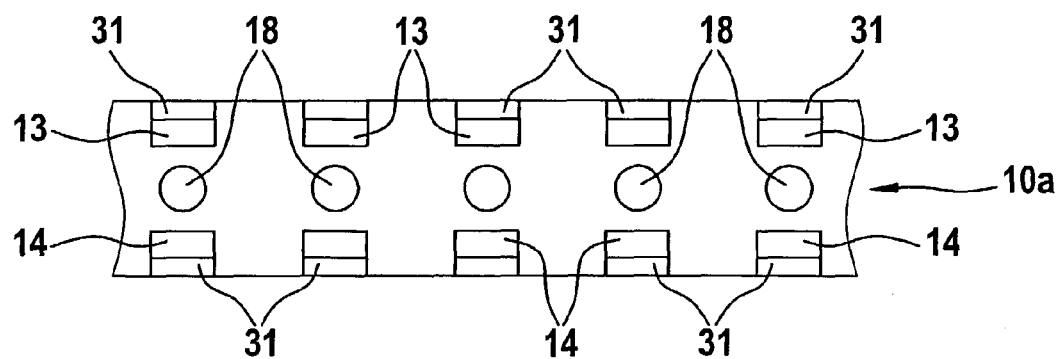
Figure 4:
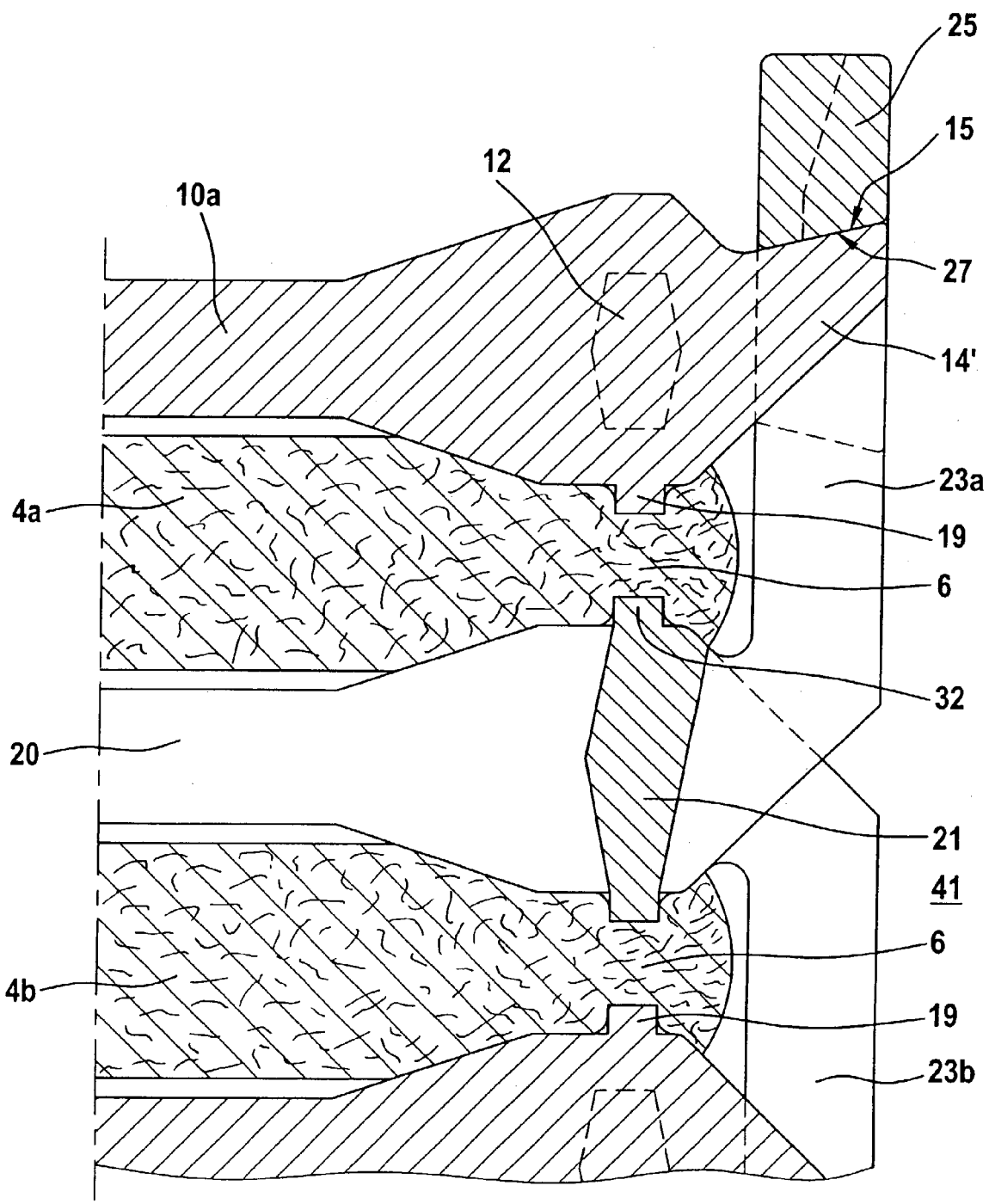
Figure 5:
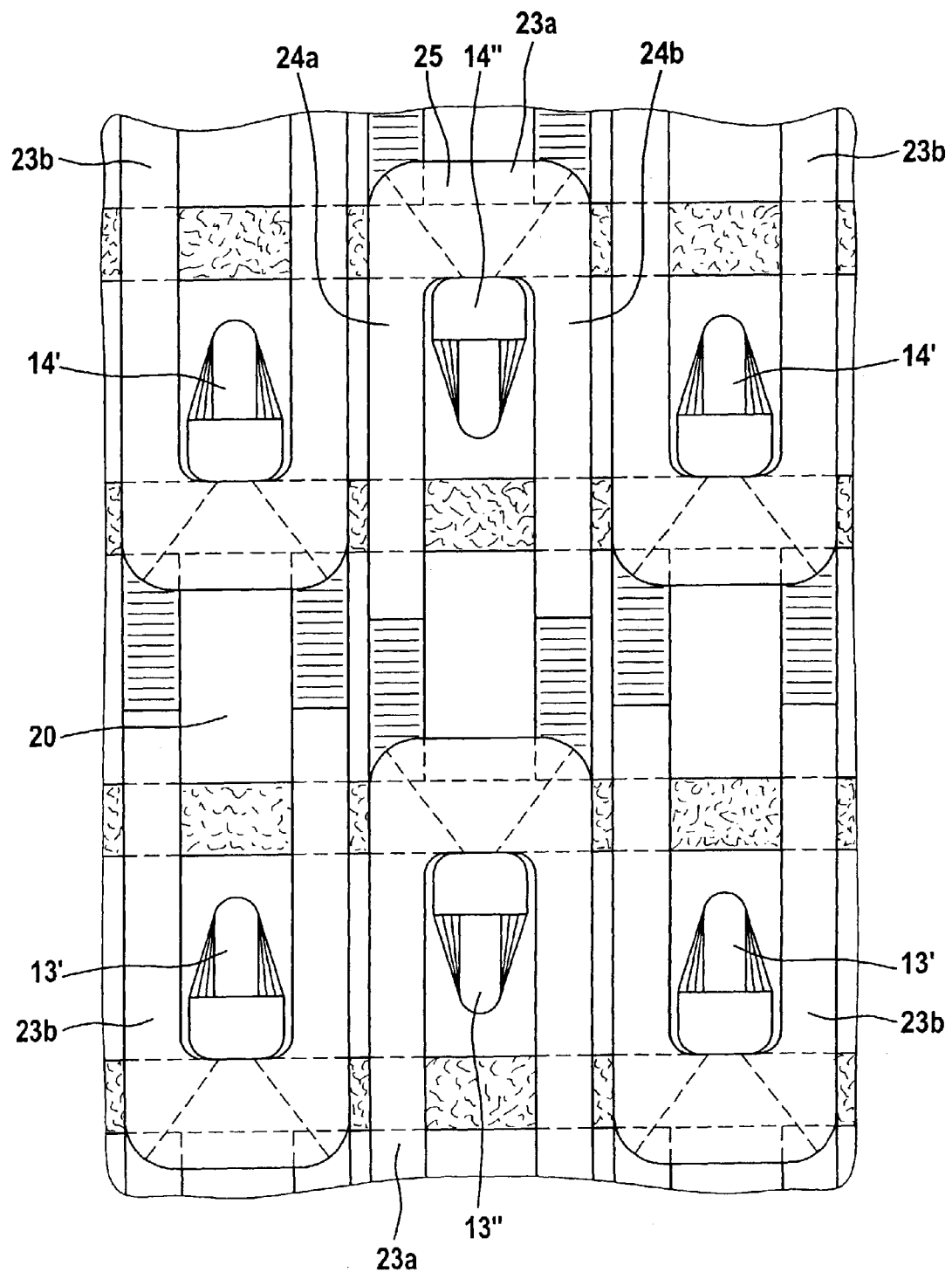
Figure 6A:
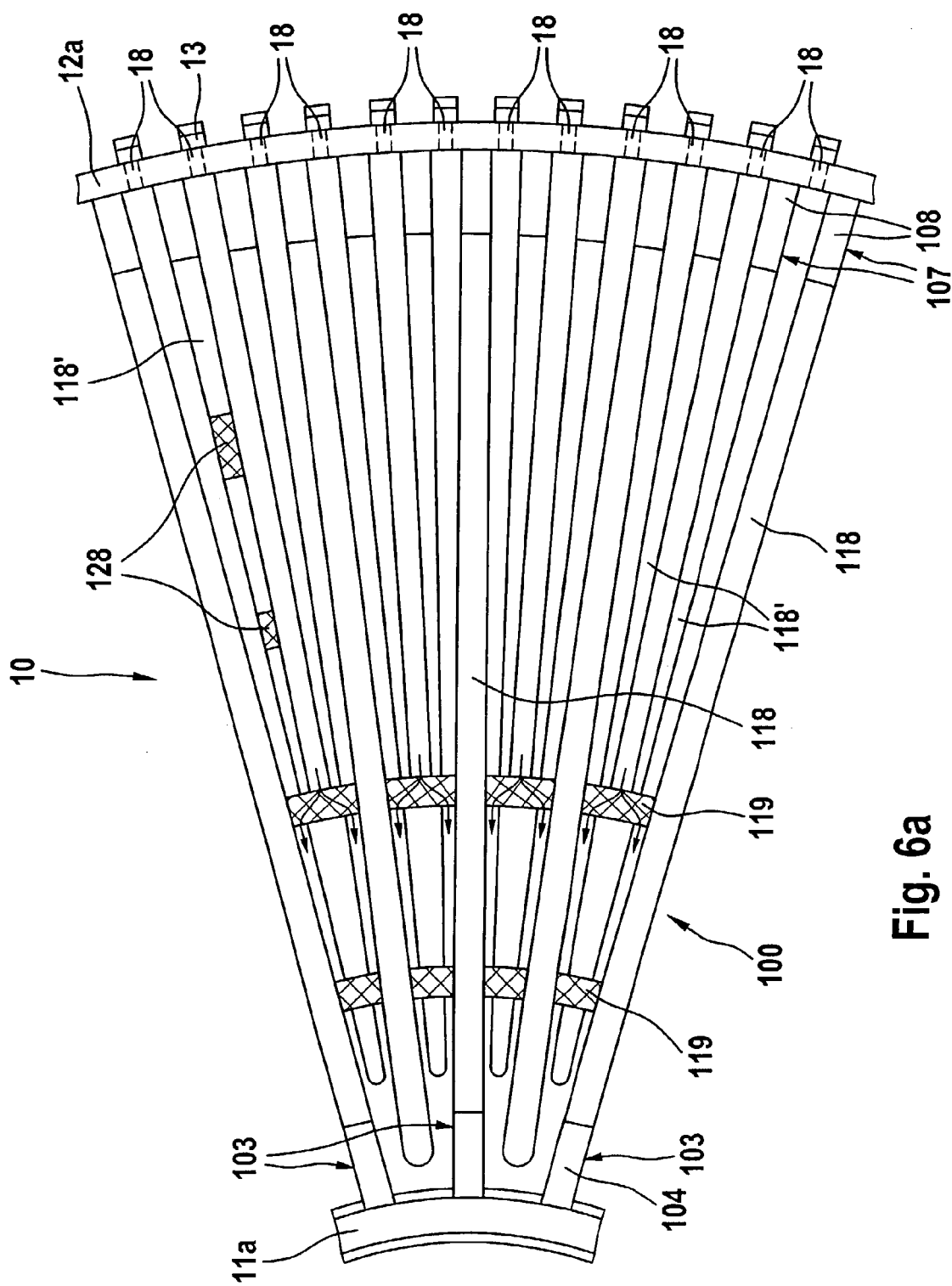

FIGS. 3b,c show a view from above of a section of the circumferential edge of a spacer element according to two embodiments;

FIG. 4 shows a section through a filter module according to another embodiment;

FIG. 5 shows a partial view from above of the filter module shown in FIG. 4;

FIGS. 6a,b show top-views of segments of the draining spacer elements; and

Figure 7:
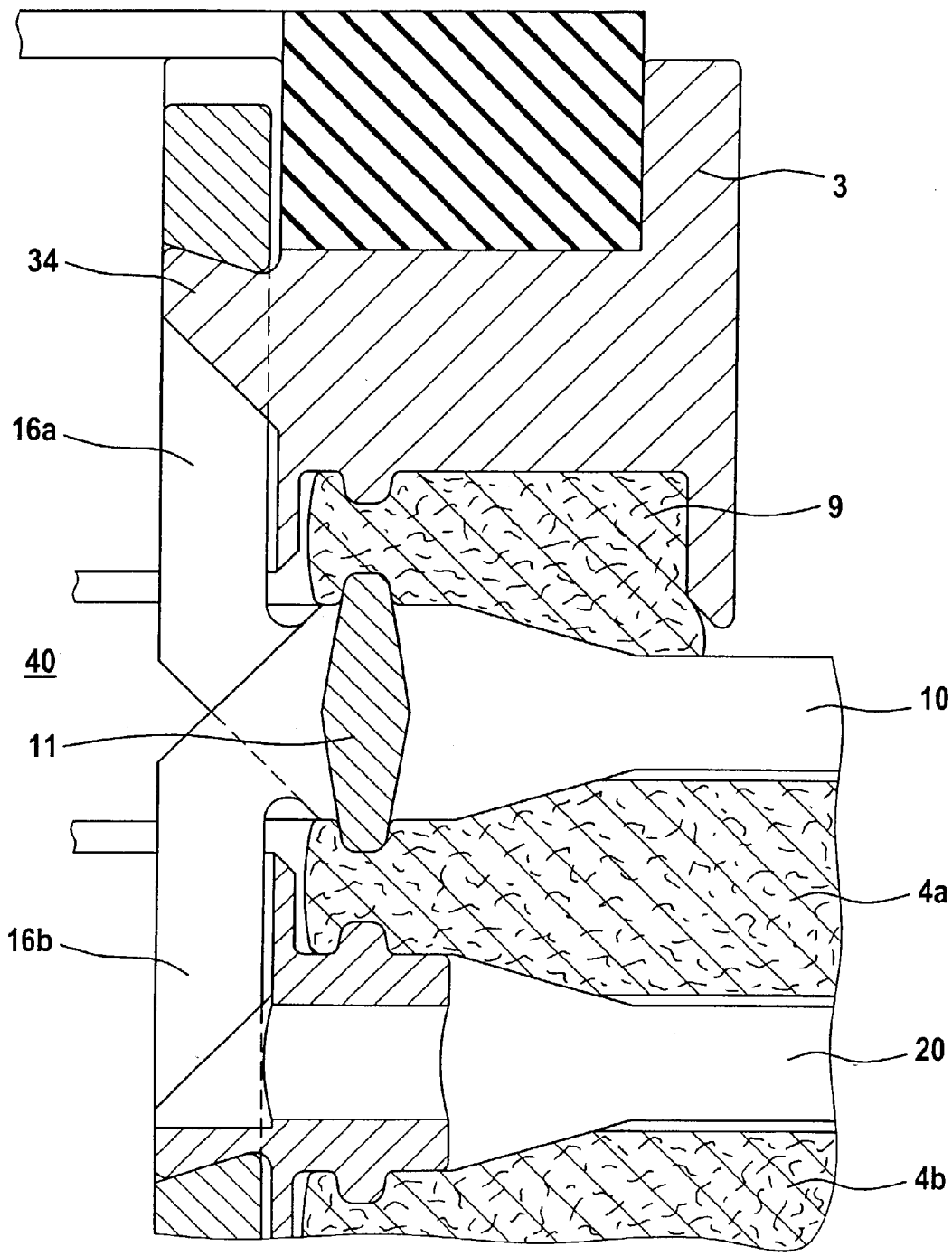

FIG. 7 shows a section through a filter module according to another embodiment.

Figure 1:
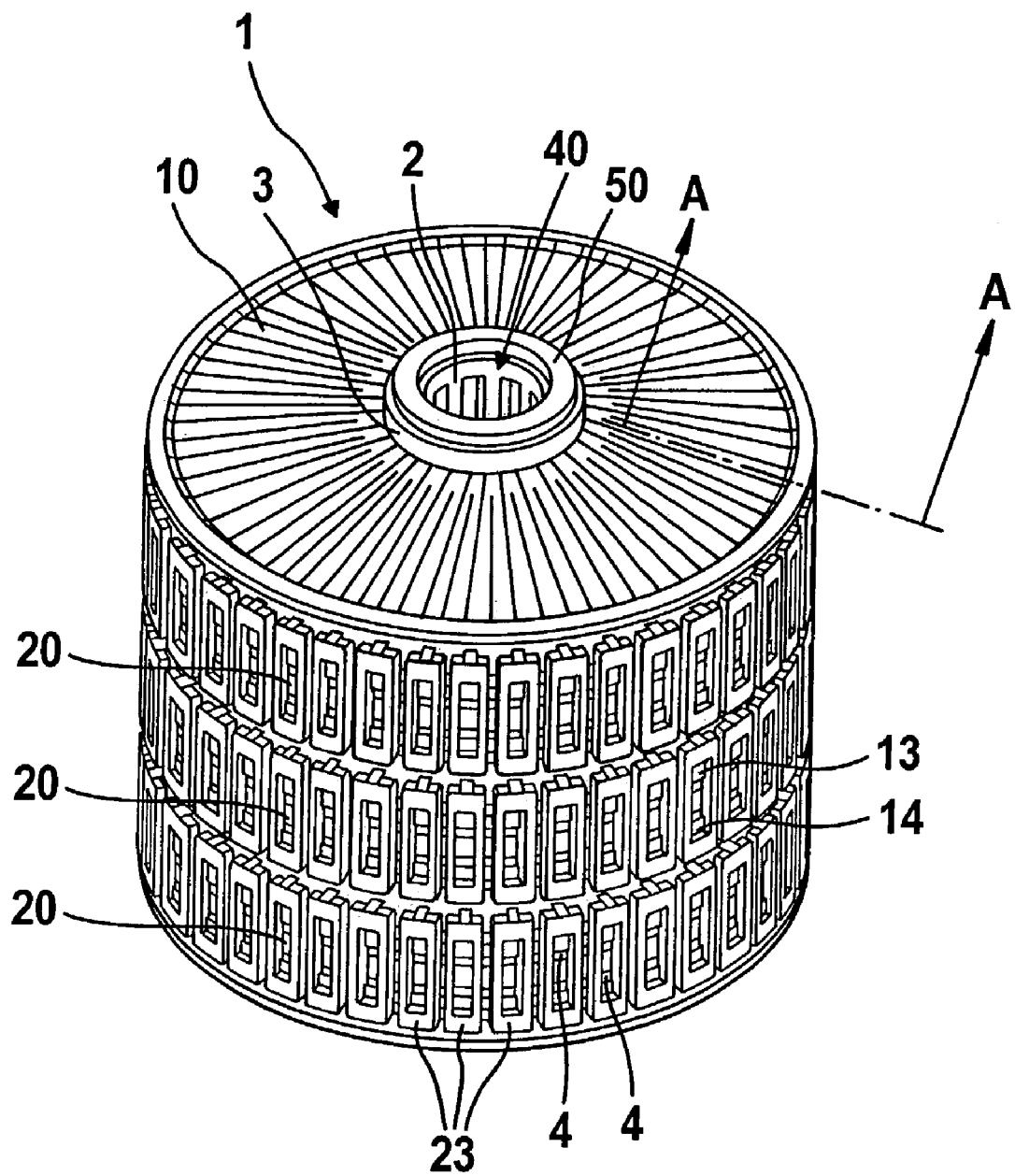
FIG. 1 shows a view of the filter module.

A complete filter module 1 is depicted in FIG. 1. Filter layers in the form of filter strata 4 alternate with first and second draining spacer elements 10, 20. All components of the filter module 1 are lined up on a central tube 2, which has a lower end piece 8 (see FIG. 2) and an upper end piece 3, which attaches the filter strata 4 and the draining spacer elements 10, 20 on the central tube 2.

On their outer side, the second draining spacer elements 20 have U-shaped clips 23 pointing up and down, in which the catching lugs 13, 14 of the first draining spacer elements 10 reach. The clips 23 and the catching lugs 13, 14 together respectively form a clip-type connection. In the embodiment depicted in FIG. 1, the clips are arranged continuously on the outer circumference, so that a stable filter module 1 is created that is easily wielded and that cannot be distorted during use.

Figure 2A:
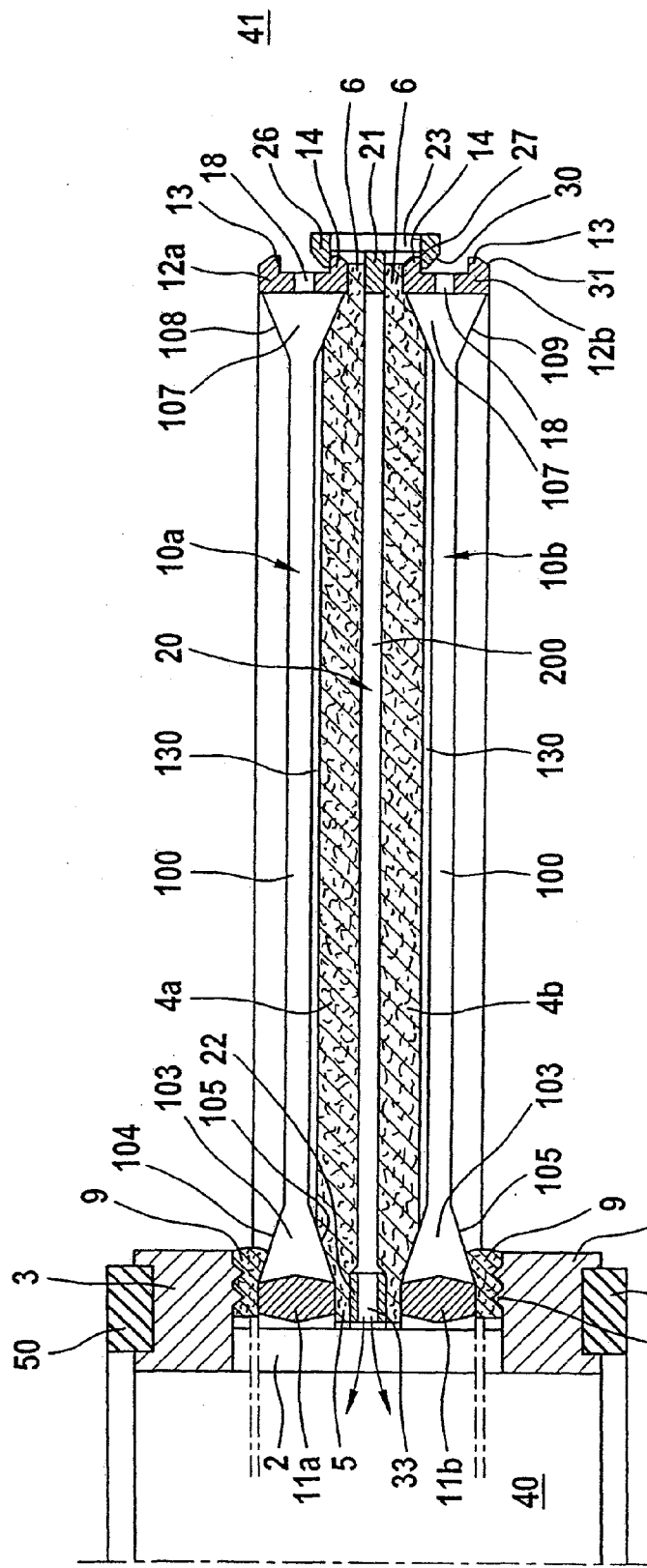
FIG. 2 shows a section through the filter module shown in FIG. 1, along line A-A.
FIG. 2b shows a section through a first draining spacer element.

In FIG. 2a is shown a section line A-A through the filter module 1 shown in FIG. 1 for the sake of simplicity, only two filter strata 4a and 4b are shown, with the draining spacer elements 10a, b 20 that pertain to them.

The first draining spacer elements 10a, b have ring-shaped sealing elements 11a, 11b that have a hexagonal cross-section in the embodiment shown here. Connecting radially outward over the outer circumference of the ring-shaped sealing elements 11a, 11b are distributed inner wedge-shaped connecting elements 103 that have an upper and lower wedge-surface 104, 105. These wedge-shaped connecting elements 103 taper outward radially, wherein the thickness lessens from the thickness of the corresponding sealing elements to the thickness of the drainage element 100 or the thickness of the corresponding straps 118, 118' of the drainage element 100 (see also FIG. 6a). Connecting radially outward to the drainage element 100 are outer wedge-shaped connecting elements 107 with upper and lower wedge-surfaces 108, 109. The wedge-shaped connecting elements 107 transition into the flow elements 12a, 12b, which for a ring whose thickness corresponds to the thickness of the sealing element 11a, 11b. The catching lugs 13 are formed to the flow elements 12a, b, and the flow channels 18 are arranged in the flow elements 12a, b in the middle. The draining spacer elements, the wedge-shaped connecting elements, the sealing elements, and the flow elements that formed in one piece, for example as a mold part made of plastic.

Between drainage elements 100 and the respective adjacent filter strata 4a, 4b, there is a gap-shaped intermediate chamber 130, so that the filter stratum 41b is not subject to any load in this area and can be extended by swelling without impediment. The complete functionality and effectiveness of the filter stratum 4a,b. Without having to change the draining spacer elements 10a, b, 20, filter layers of various thickness can be installed. When the filter module is operated in a reverse direction of flow, the gap 130 can be closed depending on the thickness of the filter stratum 4a, b, and a gap can be formed between the drainage element 200 and the adjacent filter stratum or filter layer.

During assembly, the wedge-shaped connecting elements cooperate with the second draining spacer elements 20 in a radial direction to continually press the filter stratum, whereby the seal is improved. The second draining spacer elements 20 have a ring-shaped flow element 22 with flow channels 33. The ring-shaped flow element 22 has a greater thickness than the drainage element 200 connecting radially outward, to which the ring-shaped sealing element 21 connects radially outward. The second draining spacer element 20 is preferably manufactured in one-piece out of plastic. The clips 23 are formed on the outer side of the sealing element 21, which is formed as a seal ring having a thickness corresponding to the thickness of the draining spacer element 20. The clips 23 extend upward and downward and possess clip lugs 26 and contact surfaces 27 on their inner side and gliding bevels 30 on their outer side.

The non-filtrate sealing element 11a and the non-filtrate flow element 12a of a non-filtrate spacer element 100 are thicker in the axial direction than the filtrate sealing element 21 and the filtrate flow element 22 of a filtrate spacer element 20.

The filter strata 4a, b and the spacer elements 10a, b, 20 are aligned on the central tube on which the lower end piece 8 and the upper end piece 3 are fastened. On their front, these end pieces 3 and 8 bear ring-shaped seal elements 50 that are formed as flat seals. The interior of the central tube 2 forms the filtrate/non-filtrate channel 40.

Between the end pieces 3 and 8 equipped with pins, the following components are clipped from above to below: intermediate element 9 made of filter material, seal element 11a, filter stratum 4a, flow element 22, filter stratum 4b, sealing element 11b, and intermediate element 9. The sealing elements 11a and 11b are formed on both sides as bead-like swellings of the drainage elements 100 on the basis of the wedge-shaped connecting elements 103 and in the embodiment shown here possess a hexagonal cross-section. The bead-like sealing elements 11a and 11b are adjacent in a sealing manner on one side to the intermediate element 9 and on the other to the inner wall 5 of the filter stratum 4a and 4b.

The flow element 22, which forms a connection via flow channels 33 between the chamber between the filter strata 4a and 4b and the filtrate/non-filtrate chamber 40, is a bead-like swelling of the second draining spacer element 20 on both sides.

When the components for filter module 1 are put together, the filter strata 4a and 4b are pressed together and sealed on the inner wall 5 as a result of the design of the sealing elements 11a and 11b and the flow element 22, so that bypasses are prevented in this area.

On the outer circumference, the second draining spacer element 20 possesses a sealing element 21 in order to form a seal against the surrounding chamber that forms the filtrate/non-filtrate chamber 41.

The flow elements 12a, b represent the connection between the chamber above and below the filter strata 4a, b and the filtrate and/or non-filtrate chamber 41. Above and below the flow channels 18 are arranged catch lugs 13, 14 with gliding bevels 31 that cooperate with the clip lugs 26 in the assembled state and form a clip-type connection.

Between the sealing element 21 and the flow element 22, the outer edge 6 of the filter layers 4a and 4b are pressed together.

The arrows indicate the flow direction of the non-filtrate and/or filtrate. The non-filtrate is fed out of the non-filtrate chamber 41 and reaches the filter strata 4a and 4b through the flow channels 18. After entering through the filter strata 4a and 4b, the filtrate collects in the area of the second draining spacer element 20 and flows down through its flow element 22 into the filtrate chamber 40 within the central tube 2. The flow direction can also be reversed. In this case, the chamber 40 forms the non-filtrate chamber and the chamber 41 forms the filtrate chamber.

Figure 2B:
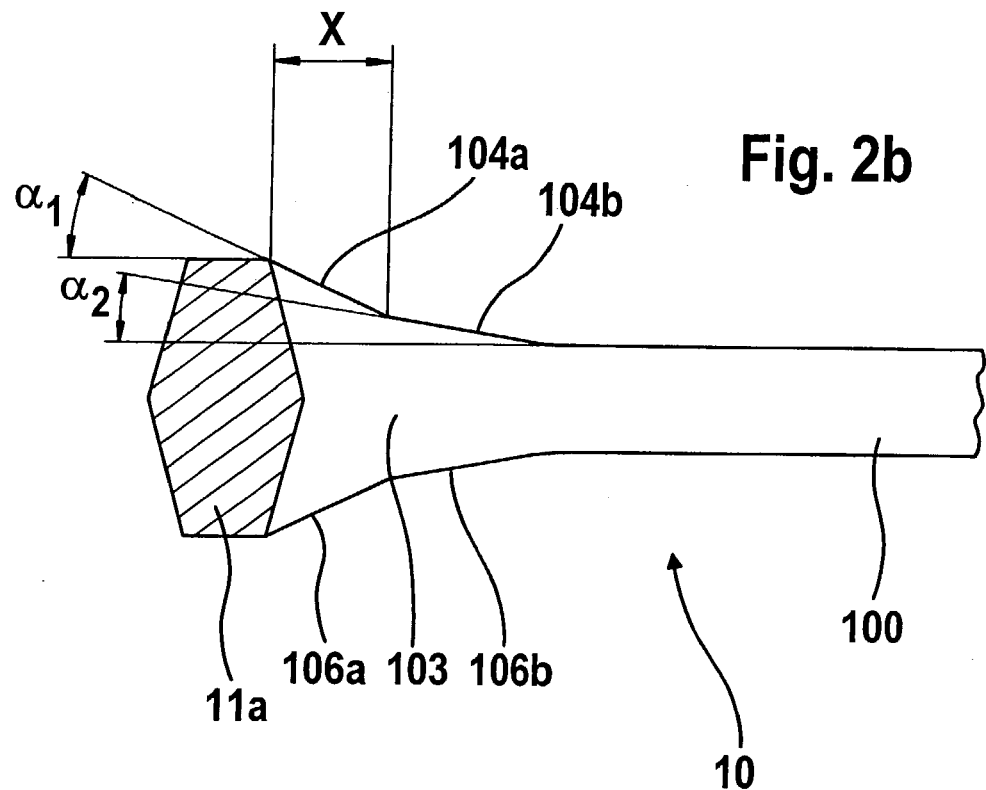

In FIG. 2b, another embodiment of the wedge-shaped connecting element 103 is depicted. Instead of an individual wedge surface, two wedge-shaped surfaces 104a, b and 106a, b are provided on the upper and lower side respectively. The wedge surfaces 104a, 106a are more inclined than the wedge surfaces 104b, 106b, which border the drainage element 100. This means that $\alpha_1 > \alpha_2$ is valid for the pertinent angle. The wedge-shaped connecting element 103 (see FIG. 2a) can be formed accordingly.

In FIG. 3a, four clips 23 are depicted. These clips are formed to the ring-shaped sealing element 11 as U-shaped clips pointing up and down. Each clip 23 possesses two vertical members 24 and a connecting cross-member 25, on whose corresponding back side is arranged a clip lug 26 is arranged.

In FIG. 3b, a top-view of a section of the circumferential edge of a draining spacer element 10a is shown. In the middle, the flow channels 18 are arranged and above and below the flow channels 18 are arranged catch lugs 13 and 14 that are distributed uniformly over the circumferential edge with an interval. The catch lugs 13 and/or 14 possess sliding surfaces 31 on their outer side.

Figure 3C:
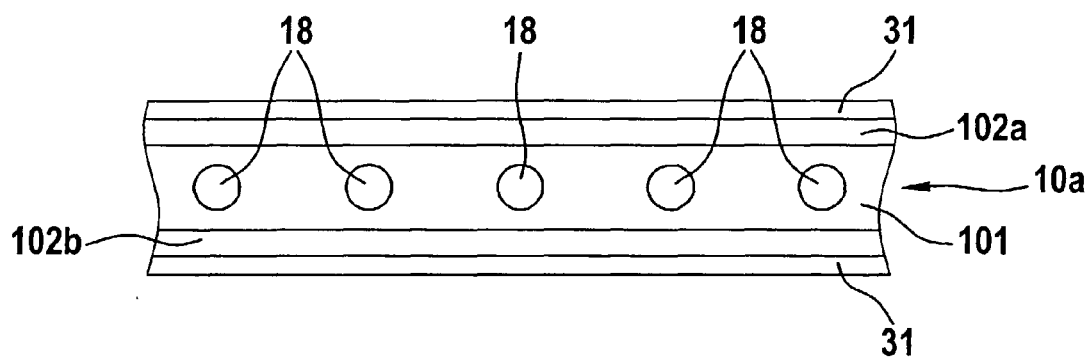

In FIG. 3c, another embodiment is depicted in which, instead of catch lugs 13 and/or 14, catch rings 102a, 102b are provided that border an intermediate slot 101 in which the flow channels 18 are arranged. There also exists the possibility of attaching the embodiments shown in FIG. 3b and 3c to the sealing elements instead of to the flow elements.

In FIG. 4, another embodiment is depicted in which the sealing elements 21 and the flow elements 12 have ring-shaped pressure shoulders 19 and 32. the clips 23a, b are arranged on the sealing element 21 pointing upward and downward in an alternating manner, as this can be seen in FIG. 5. Accordingly, the catch lugs 14', 14" and 13', 13" are arranged in an alternating manner. The contact surface 15 of the catch lugs 14' and the contact surface 27 of the cross-member 25 of the clip 23a are inclined, the contact surface 15 being inclined inwardly (see FIG. 4). A secure hold is thereby ensured so that the clips 23a cannot move to the outside under load. A clip-type lock or clip-like connection is thus made.

In FIG. 6a a segment of a circular first spacer element 10 is shown. On the inner circumference, the ring-shaped sealing element 11a is located, to which the wedge-shaped connecting elements 103 connect radially outward with the upper wedge surfaces 104, which transition into the radial straps 118 of the drainage element 100. Also provided are shortened radial straps 118', which extend inwardly from the ring-shaped flow element 12a arranged on the outer circumference of the draining spacer element 10. The radial straps 118, 118' are connected to one another by circular straps 119. The graph-lined sections of the circular straps 119 and the areas 128, that are depicted on only one strap 118', have a reduced thickness compared with the remaining straps and strap segments in order to enable cross-flow if necessary.

On the radial outer end, the straps 118, 118' have wedge-shaped connecting elements 107, of which the upper wedge surface can be seen. The ring-shaped flow element 12a connects to this with the flow channels 18 and the catch lugs 13.

Figure 6B:
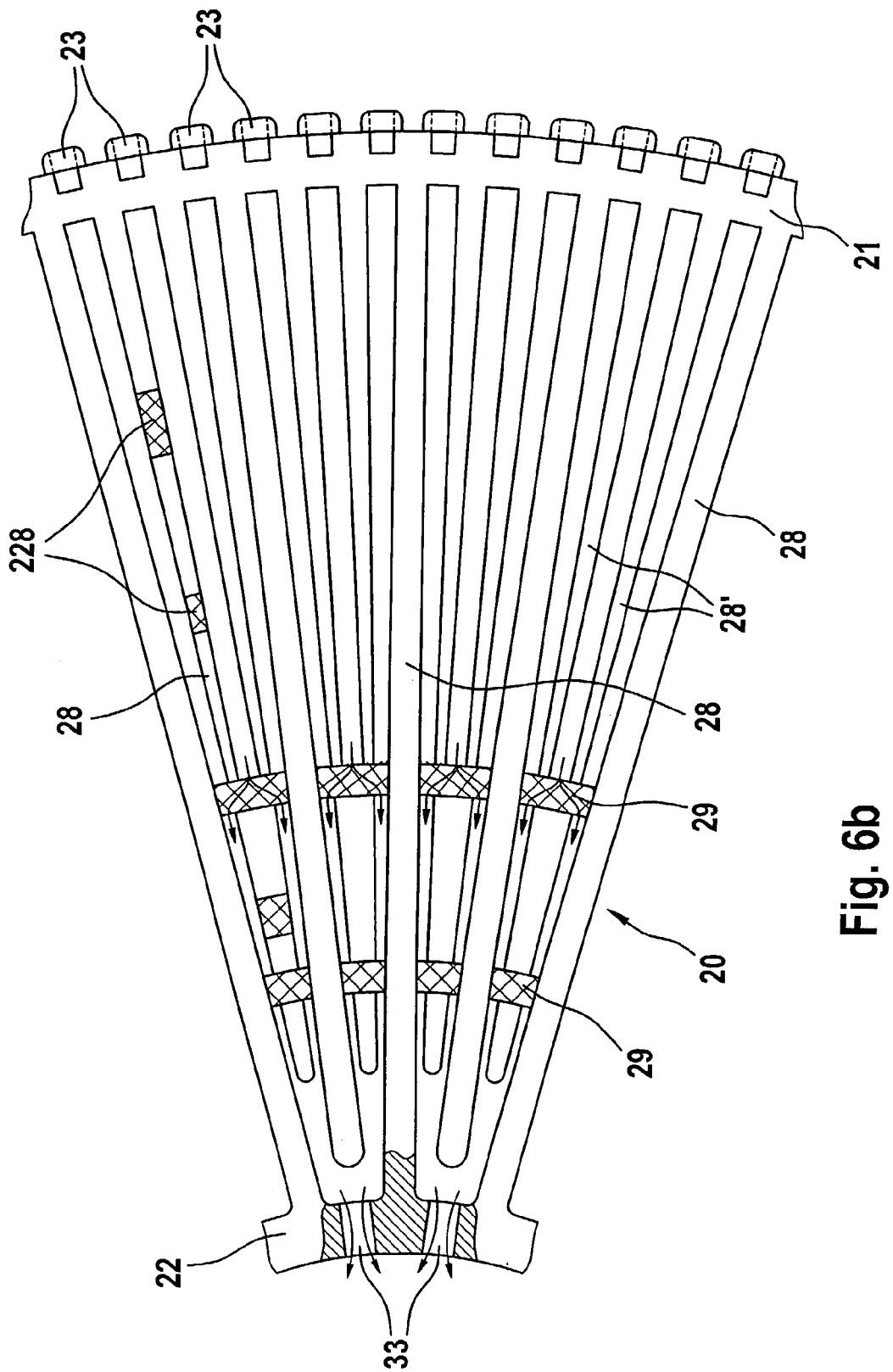

In FIG. 6b, a segment of a circular second spacer element 20 is shown. The clips 23 are formed to the outer circumference of the ring-shaped sealing element 21. The flow element 22 with the flow channels 33 is located on the inner circumference. Between flow element 22 and sealing element 21 are radially arranged straps 28, 28' and circular straps 29, there being continuous straps 28 and shortened straps 28'. The interval of the radial straps 28, 28' is adapted to the filter material to ensure an optimal support of the filter layer both during filtration and backwashing. Width, length, and arrangement of straps 28, 28', and 29 must be thus adapted respectively to the filter material and the filter's task. The hatched sections of the circular straps 29 and the areas 228, that are shown on only one strap 28, have a reduced thickness compared with the remaining straps and strap segments in order to enable cross-flow, if necessary.

In FIG. 7, another embodiment is depicted, which shows the connection in the area of the filtrate/non-filtrate channel 40. In this embodiment a central tube 2 is not used because the first draining spacer elements 10 with the ring-shaped sealing elements 11 have clips 16a, b that cooperate with corresponding catch lugs 34 that are formed either to the upper end piece 3 or to the second draining spacer elements 20. The similar clip-like connection corresponds to the connection that is depicted in FIGS. 4 and 5.

The invention claimed is:

1. A filter module comprising:
   a plurality of filter layers, each filter layer including a filtrate surface, an opposite non-filtrate surface, a first end region and a first periphery, and a second end region and a second periphery and further including a filter medium;
   a plurality of draining spacer elements including filtrate spacer elements and non-filtrate spacer elements, each filtrate spacer element including a filtrate sealing element at a first edge region of the filtrate spacer element, a filtrate flow element at a second edge region of the filtrate spacer element, and a filtrate drainage element intermediate the filtrate sealing element and the filtrate flow element and each non-filtrate spacer element including a non-filtrate flow element at a first edge region of the non-filtrate spacer element, a non-filtrate sealing element at a second edge region of the non-filtrate spacer element, and a non-filtrate drainage element intermediate the non-filtrate flow element and the non-filtrate sealing element;

wherein the plurality of filter layers and draining spacer elements are stacked on one another in an axial direction of the filter module, the stack comprising a non-filtrate spacer element, a filter layer, a filtrate spacer element, a filter layer, a non-filtrate spacer element, a filter layer, and a filtrate spacer element and the stack defining a filtrate chamber adjacent the filtrate surface of each filter layer and a non-filtrate chamber adjacent the non-filtrate surface of each filter layer;

wherein each filter layer is positioned between a non-filtrate spacer element and a filtrate spacer element, each non-filtrate drainage element is positioned between and fluidly communicates with the non-filtrate surfaces of adjacent filter layers, and each filtrate drainage element is positioned between and fluidly communicates with the filtrate surfaces of adjacent filter layers;

wherein the non-filtrate sealing element and the non-filtrate flow element of each non-filtrate spacer element are thicker in the axial direction than the intermediate non-filtrate drainage element, and the non-filtrate drainage element extends along a space between the non-filtrate surfaces of adjacent filter layers;

wherein the first end region of each filter layer is compressed and sealed along the first periphery between a non-filtrate flow element of a non-filtrate spacer element and a filtrate sealing element of a filtrate spacer element, the non-filtrate flow element fluidly communicating between the non-filtrate drainage element of the non-filtrate spacer element and one of the exterior and interior chambers while the filtrate sealing element seals the filtrate drainage element of the filtrate spacer element from said one of the exterior and interior chambers, and the second end region of each filter layer is compressed and sealed along the second periphery between a non-filtrate sealing element of the non-filtrate spacer element and a filtrate flow element of the filtrate spacer element, the filtrate flow element fluidly communicating between the filtrate drainage element of the filtrate spacer element and the other of the exterior and the interior chambers while the non-filtrate sealing element seals the non-filtrate drainage element of the non-filtrate spacer element from said other of the exterior and interior chambers; and wherein each draining spacer element comprises connecting means for connecting together the first edge regions of the adjacent draining spacer elements.

2. A filter module according to claim 1 wherein the connecting means of adjacent spacer elements cooperate.

3. A filter module according to claim 1 wherein the connecting means cross over to at least the adjacent spacer element and cooperate with the connecting means of at least one of the following spacer elements.

4. A filter module according to claim 1 wherein the filter module has an inner circumference and an outer circumference and wherein the non-filtrate spacer element has the sealing element on the inner circumference and the filtrate spacer element has the sealing element on the outer circumference.

5. A filter module according to claim 1 wherein the non-filtrate spacer element has a wedge-shaped connecting element between the drainage element and the sealing element.

6. A filter module according to claim 1, wherein the non-filtrate spacer element includes a wedge-shaped connector between the non-filtrate drainage element and one of the non-filtrate sealing element and the non-filtrate flow element, the wedge-shaped connector having at least an upper wedge surface and at least a lower wedge surface.

7. A filter module according to claim 1 wherein the drainage element of a draining spacer element is formed in one piece with the sealing element.

8. A filter module according to claim 1 wherein the connecting means are in one piece with a draining spacer element.

9. A filter module according to claim 1 wherein the connecting means are rated in such a way that they can withstand a tractive stress that corresponds to a clamping pressure between 1 N/mm$^2$ to 30 N/mm$^2$ in the pressing and sealing action on the filter layers.

10. A filter module according to claim 1 wherein a flow element or a sealing have element of a draining spacer element has the connecting means in the vicinity of the first edge region.

11. A filter module according to claim 1 wherein the connecting means include clips that interact with catch lugs, wherein the clips are arranged in a circumferential direction of the draining spacer elements and are gripped in the catch lugs.

12. A filter module according to claim 11, wherein the clips are L-shaped or U-shaped.

13. A filter module according to claim 11 wherein the clips alternate by pointing up and down along the axial direction.

14. A filter module according to claim 11 wherein the clips are arranged directly next to one another in a circumferential direction of the draining spacer element.

15. A filter module according to claim 11 wherein the clips are arranged with an interval to one another in a circumferential direction of the draining spacer element, whereby the interval is a maximum of 500 mm.

16. A filter module according to claim 11 wherein the clips have gliding bevels facing the catch lugs.

17. A filter module according to claim 11 wherein the catch lugs have sliding surfaces facing the clips.

18. A filter module according to claim 1 wherein the connecting means include a slot running around on a draining spacer element and catch hooks on another draining spacer element that reach into the slot.

19. A filter module according to claim 1 wherein contact surfaces of the connecting means are inclined to provide a secure hold under a tensile load.

20. A filter module according to claim 1 wherein the connecting means are provided exclusively on an outer circumference defined by the first edge region of the draining spacer elements.

21. A filter module according to claim 1 wherein the filter module has an outer circumference and the first end region of each filter layer and first edge region of each draining spacer element is along the outer circumference.

22. A filter module according to claim 1 wherein the non-filtrate spacer element has a wedge-shaped connecting element between the drainage element and the flow element.

23. A filter module according to claim 1 wherein the drainage element of a draining spacer element is formed in one piece with the flow element.

24. A filter module according to claim 1 wherein a non-filtrate spacer element includes a wedge-shaped connector element, the drainage element being formed in one piece with the wedge-shaped connector element.

25. A filter module according to claim 1 wherein the connecting means are in one piece with the filtrate spacer element.

26. A filter module according to claim 1 wherein the space between the non-filtrate surfaces of adjacent filter layers includes a gap between the non-filtrate surface of a filter layer and the non-filtrate drainage element.

27. A filter module according to claim 1 wherein each draining spacer element, including the flow element, the drainage element, and the sealing element, comprises a one-piece plastic part.

28. A filter module according to claim 1 wherein the flow element and the sealing element of the non-filtrate spacer element press against the non-filtrate surface in the end regions of the filter layer and the sealing element and the flow element of the filtrate spacer element press against the filtrate surface in the end regions of the filter layer.

29. A filter module according to claim 1 wherein each non-filtrate spacer element, including the flow element, the drainage element, and the sealing element, comprises a one-piece plastic part, wherein each filtrate spacer element, including the sealing element, the drainage element, and the sealing element, comprises a one-piece plastic part, wherein the flow element and the sealing element of the non-filtrate spacer element press against the non-filtrate surfaces in the end regions of adjacent filter layers, and wherein the sealing element and the flow element of the filtrate spacer element press against the filtrate surfaces in the end regions of adjacent filter layers.

30. The filter module according to claim 1 wherein the filtrate flow element of a filtrate spacer element is thicker in the axial direction than the filtrate drainage element.

31. The filter module according to claim 1 wherein the non-filtrate sealing element and the non-filtrate flow element of a non-filtrate spacer element are thicker in the axial direction than the filtrate sealing element and the filtrate flow element of a filtrate spacer element.

* * * * *